United States Patent [19]

Todaka

[11] Patent Number: 5,555,104
[45] Date of Patent: Sep. 10, 1996

[54] OPERATION UNIT OF ELECTRONIC EQUIPMENT UTILIZING VISUALLY DISPLAYED FUNCTIONS ON A TOUCH SCREEN

[75] Inventor: Shinji Todaka, Kawasaki, Japan

[73] Assignee: Canon Kabushiki Kaisha, Tokyo, Japan

[21] Appl. No.: 207,192

[22] Filed: Mar. 8, 1994

[30] Foreign Application Priority Data

Mar. 10, 1993 [JP] Japan .................................. 5-076276
Jul. 23, 1993 [JP] Japan .................................. 5-182519

[51] Int. Cl.$^6$ ............................................. H04N 1/00
[52] U.S. Cl. ........................... 358/468; 358/400; 395/155
[58] Field of Search .................................. 345/113, 118, 345/146, 173, 174, 178; 395/155, 164; 358/400, 468; H04N 1/00

[56] References Cited

U.S. PATENT DOCUMENTS

| | | | |
|---|---|---|---|
| 4,914,624 | 4/1990 | Dunthorn | 345/173 |
| 5,012,280 | 4/1991 | Tsutsumi et al. | 345/173 |
| 5,090,049 | 2/1992 | Chen | 358/400 |
| 5,189,732 | 2/1993 | Kondo | 345/173 |
| 5,309,556 | 5/1994 | Sismilich | 395/161 |
| 5,321,802 | 6/1994 | Furuya et al. | 395/164 |

*Primary Examiner*—Kim Yen Vu
*Attorney, Agent, or Firm*—Fitzpatrick, Cella, Harper & Scinto

[57] ABSTRACT

An operation unit for electronic equipment can confirm invalid keys and items of in-setting and after-setting. The operation unit performs a function visually displayed on a button portion on a touch panel, arranged on a portion of the display on the screen as a button portion, and includes a method for changing the display assignment of a button which is not functioning.

4 Claims, 13 Drawing Sheets

OPERATION UNIT OF ELECTRONIC EQUIPMENT UTILIZING VISUALLY DISPLAYED FUNCTIONS ON A TOUCH SCREEN

BACKGROUND OF THE INVENTION

The present invention relates to an operation unit for electronic equipment such as a facsimile apparatus, and more particularly to an operation unit using a touch panel.

Recently, a liquid crystal touch panel has been used in office equipment such as a copying machine and facsimile apparatus. In the equipment, predetermined various keys are displayed on the touch panel, and various operations are performed when the corresponding key is pressed.

However, the operation unit using this touch panel has the following problems in the operability. (1) A key which is invalid due to the condition of a facsimile apparatus cannot be confirmed on the screen. (2) An item being set by an operator cannot be confirmed on the screen. (3) Items already set by the operator cannot be confirmed on the screen.

Furthermore, since the display area of a liquid crystal screen generally has a limitation in that keys of all operations cannot be displayed on a single screen, a menu is used so that the screen display method is switched when a key is pressed.

However, in this driven menu, the combination of buttons displayed on the screen is previously determined, and this combination could not be set by a user freely. More particularly, since frequently used buttons are different depending on the user, it is ideal to arrange those buttons on the same screen. However, the conventional touch panel could not offer such a function to the user. Accordingly, the user had to switch the screen by pressing the keys to set the frequently used function, thus the operation was troublesome.

SUMMARY OF THE INVENTION

In light of the above problems, it is a first object of the present invention to provide an operation unit for electronic equipment such that an operator can confirm an invalid key or item being set or item after set on the screen of a touch panel.

The second object of the invention is to provide an operation unit for electronic equipment capable of setting a button to an arbitrary function at an arbitrary position on a screen.

According to the first aspect of the present invention, the foregoing object is attained by an operation unit for electronic equipment having a touch panel arranged on a portion displayed on a screen as a button portion which performs a function visually displayed on the button portion when it is touched, comprising unavailable display means for changing a display of the button which will not function.

According to the second aspect of the present invention, the forgoing object is attained by an operation unit of electronic equipment having a touch panel arranged on a portion displayed on a screen as a button portion which performs a function visually displayed on the button portion when it is touched, comprising: storage means for storing the display data set in advance; and setting means for setting the button portion by combining display data stored in the storage means under the status where an arbitrary position on the screen corresponds to an arbitrary function.

Other features and advantages besides these discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENTS

Preferred embodiments of the present invention will now be described in detail in accordance with the accompanying drawings.

THE FIRST EMBODIMENT

Figure 1:
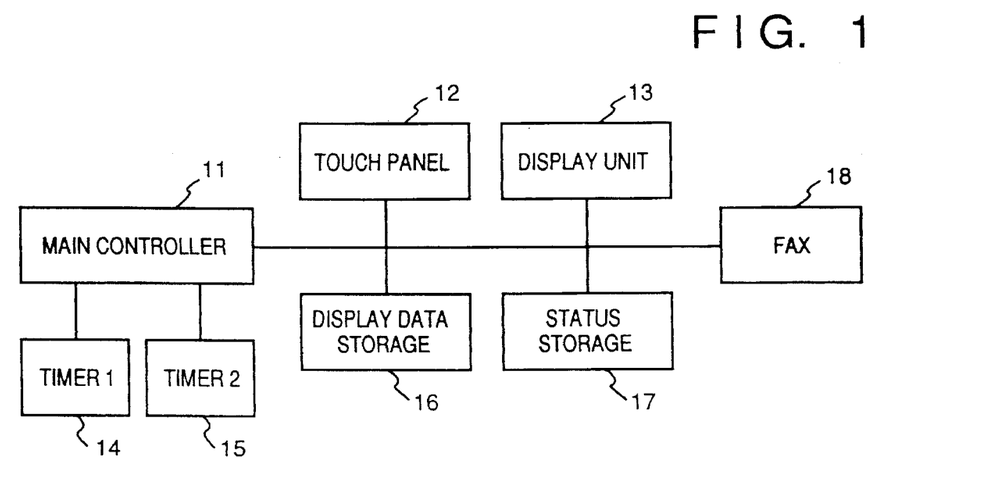
FIG. 1 is a block diagram illustrating a first embodiment of the invention.

FIG. 1 is a block diagram illustrating the construction of the first embodiment of the invention.

The operation unit according to the first embodiment is connected to the facsimile apparatus 18 comprising a reader and a recorder. The operation unit includes a main controller 11 for controlling the entire operation of the operation unit, a touch panel 12 for inputting a command through a key or keys, a display unit 13 for the performing key display or message display for touch panel, a first timer 14 used for regular observation by the main controller 11, a second timer 15 used for display, a display data storage 16 for storing the data to display on the display unit 13, and status storage 17 for storing the status of FAX and keys.

Figure 2:
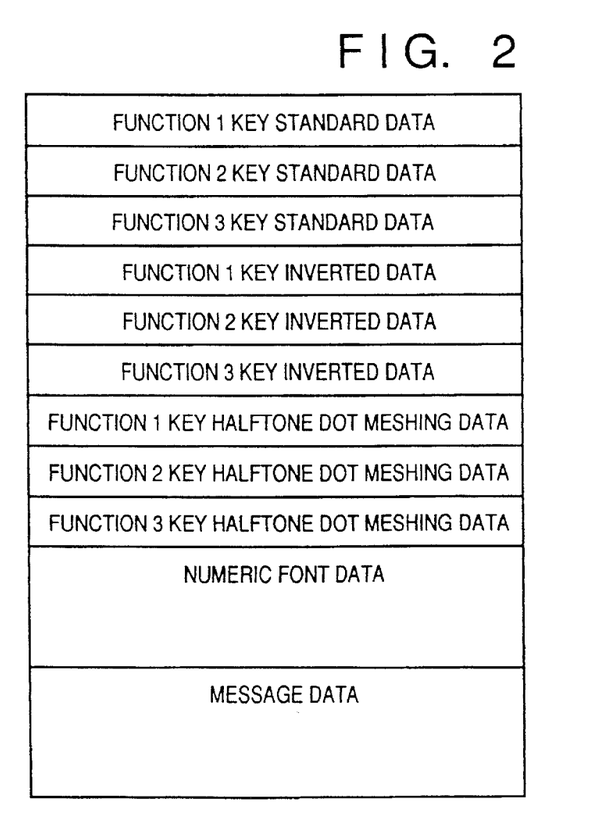
FIG. 2 is a model diagram illustrating an example of the data structure of display data storage in the first embodiment.

FIG. 2 is a model diagram illustrating an example of the data structure of the display data storage 16.

As shown in FIG. 2, three functions 1–3 respectively correspond to a standard data portion, inverted data portion and halftone dot meshing portion. Furthermore, a numeric font data portion for displaying numbers and a message data portion for displaying message data which are inputted by the user are provided.

Figure 3:
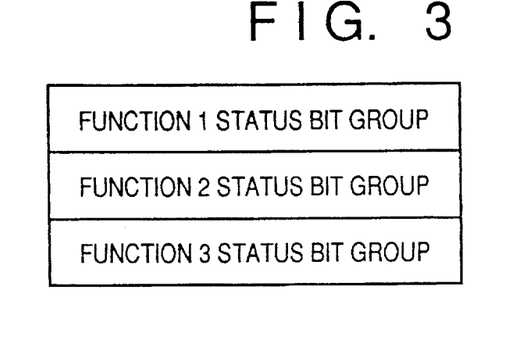
FIG. 3 is a model diagram illustrating an example of the data structure of a status storage in the first embodiment.
Figure 4:
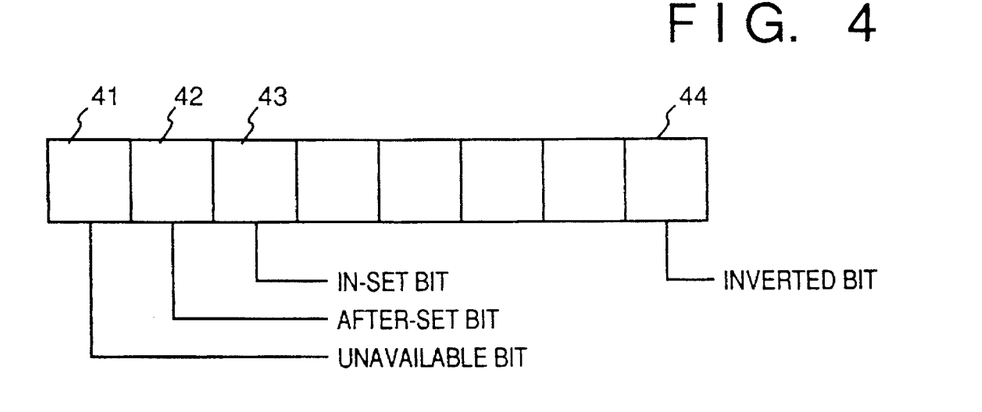
FIG. 4 is a detailed model diagram illustrating a parameter of a status bit group in the status storage shown in FIG. 3.

FIG. 3 is a model diagram illustrating an example of the data structure of the status storage 17, and FIG. 4 is a model diagram illustrating a detailed parameter of status bit group in the status storage 17 shown in FIG. 3.

The status bit group is comprised of an unavailable bit 41 which is turned on when the key is not available, after-set bit 42 which is turned on when the function has been already set, in-set bit 43 which is turned on when the function is being set, and inverted bit 44 which is turned on when the display data is complementarily displayed, i.e., the image/data colors and background colors are interchanged.

FIGS. 5A, 5B, 6A and 6B are flowcharts illustrating the operation in the embodiment. FIGS. 7A, 7B, 8A and 8B are model diagrams illustrating the display status of an actual screen.

Figure 5A:
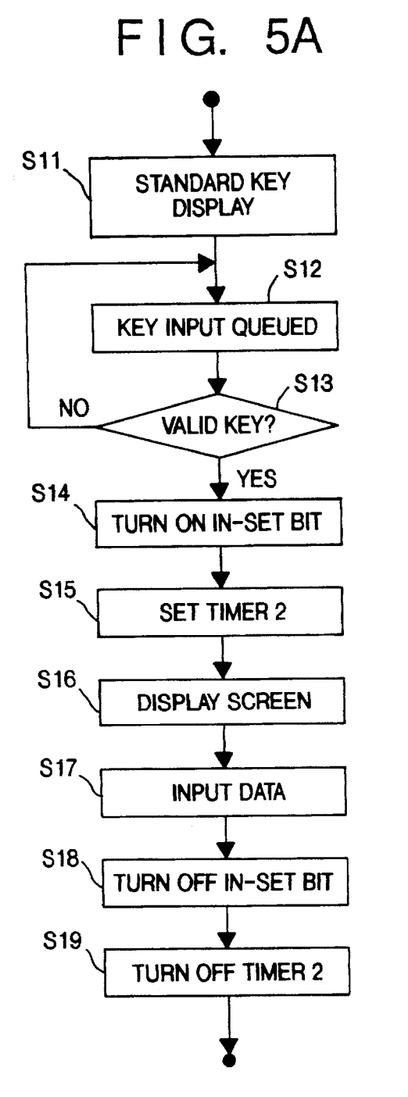
FIGS. 5A and 5B are flowcharts illustrating the operation in the first embodiment.
Figure 7A:
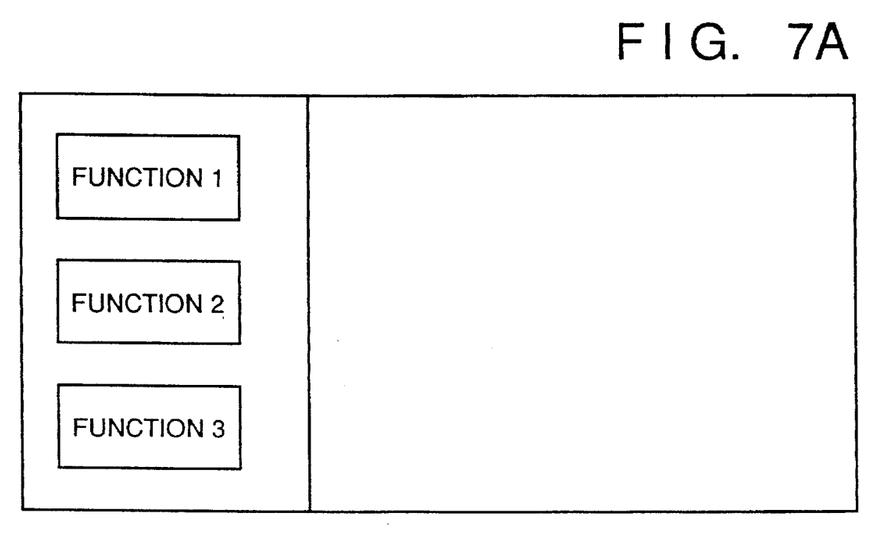
FIGS. 7A and 7B are model diagrams illustrating the display status of an actual screen in the first embodiment.

In FIG. 5A, when power of the apparatus is turned on, at step S11, the data of a standard data portion of FIG. 2 is displayed (FIG. 7A). At step S12, a key input is queued. When a key is inputted, at step S13, whether or not an unavailable bit 41 is turned on is confirmed. If turned on, it is determined as "unavailable", and again, another key input is queued at step S12. If it is not turned on, the in-set bit 43 is turned on at step S14. Subsequently, the display timer 15 is set at step S15, a setting screen is displayed at step S16, and data is inputted at step S17.

Figure 5B:
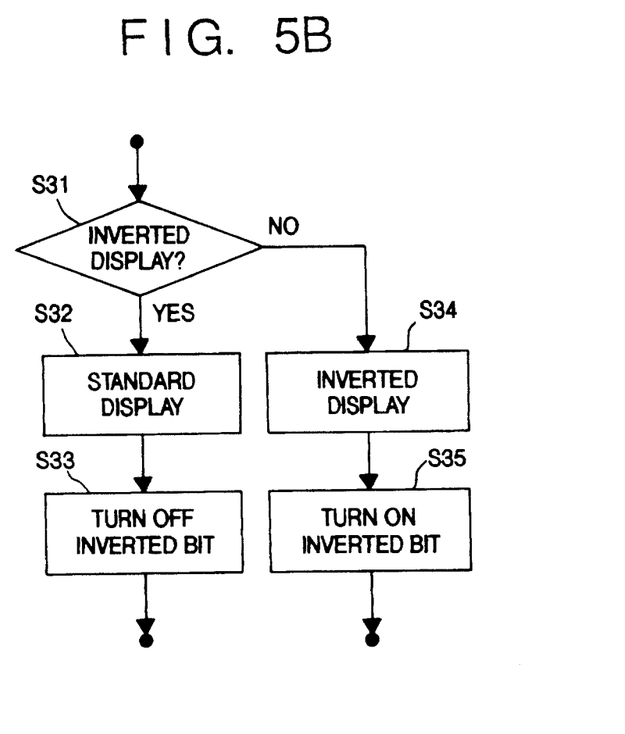

During the data input, the timer 15 set at step S15 interrupts in predetermined intervals. FIG. 5B is a flowchart illustrating the interruption processing.

If interrupted, at step S31, the inverted bit 44 of the key where the in-set bit is turned on at step S31 is confirmed. If the inverted bit 44 is turned on, at step S32, the data in the standard data portion is displayed, and at step S33, the inverted bit 44 is turned off.

On the other hand, if the inverted bit 44 is not turned on, at step S34, the data at the inverted data portion of FIG. 2 is displayed, and at step S35, the inverted bit 44 is turned on. Accordingly, the key being set performs a blinking display.

When the data input ends, the in-set bit is turned off at step S18, and the timer 2 is turned off at step S19. Subsequently, the after-set bit is turned on, and the process returns to a key input queued state at step S12.

Figure 6A:
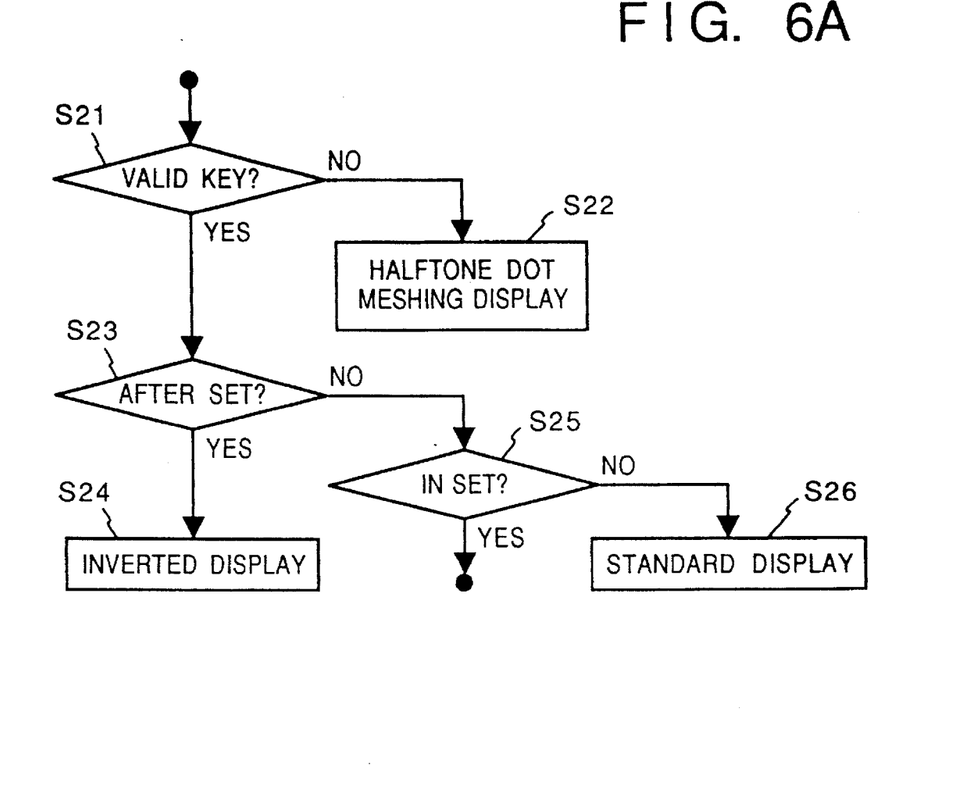
FIGS. 6A and 6B are other flowcharts illustrating the operation in the first embodiment.

FIG. 6A is a flowchart illustrating the interrupt processing generated by the first timer 14.

Figure 8A:
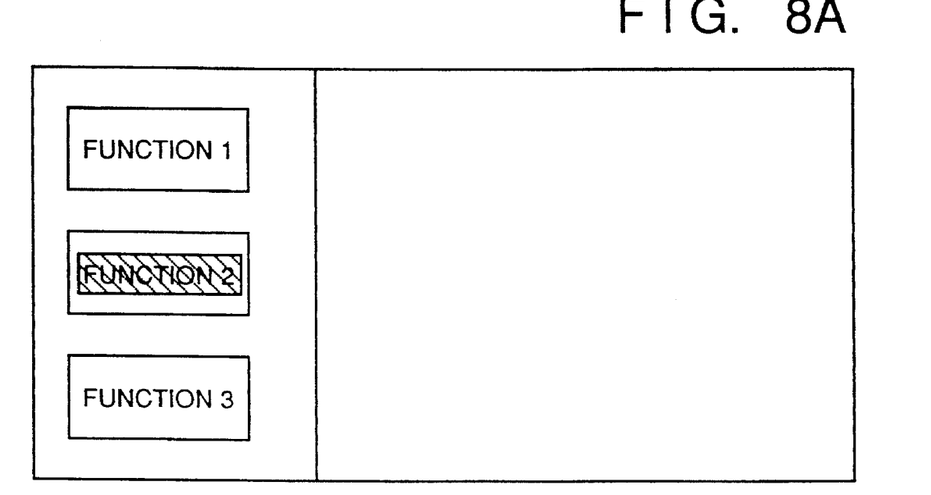
FIGS. 8A and 8B are other model diagrams illustrating the display status of an actual screen in the first embodiment.
Figure 8B:
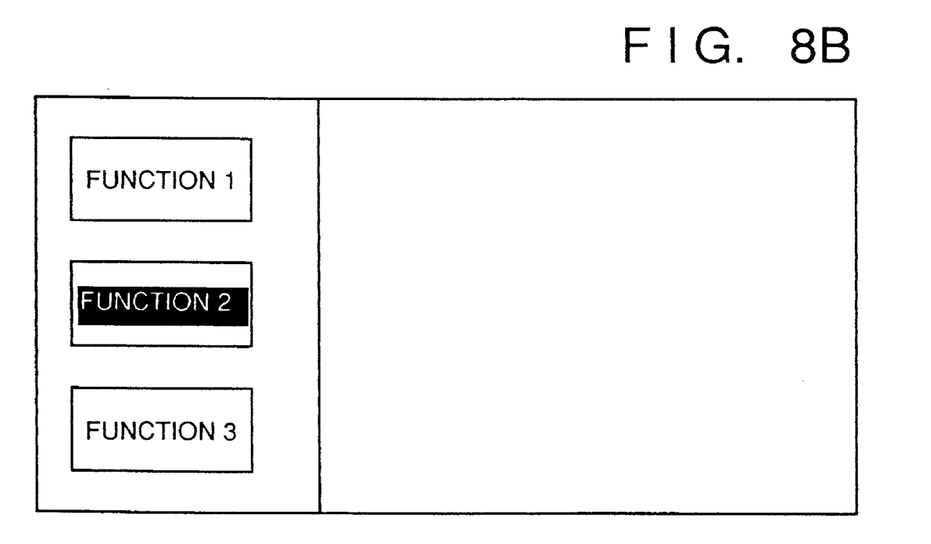

At step S21, whether or not the unavailable bit 41 is turned on, and the data in the half-tone dot meshing data portion of FIG. 2 is displayed at step S22 (FIG. 8A). If the unavailable bit 41 is not turned on, whether or not the after-set bit 42 is turned on is determined at step S23. If the after-set bit 42 is turned on, the data in the inverted data portion of FIG. 2 is displayed at step S24 (FIG. 8B). If not, whether or not the in-set bit 43 is turned on is determined at step S25. If the in-set bit 43 is not turned on, the data in the standard data portion is displayed at step S26 (FIG. 7A).

When the above processing is performed on all keys, the key which has already been set can be displayed in the inverted display, and unavailable key in the half-tone dot meshing display.

Figure 6B:
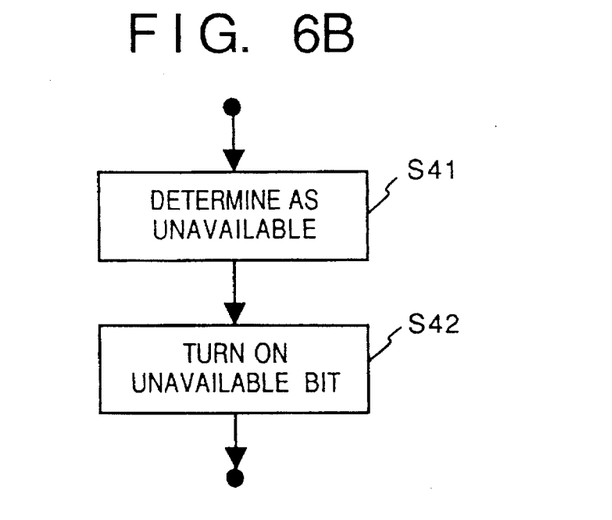

FIG. 6B is a flowchart illustrating the processing of the FAX board when a function of the facsimile becomes unavailable.

If it is determined that the function is unavailable at step S41, the unavailable bit 41 corresponding to the function which became unavailable at step S42 is turned on. Accordingly, the abnormality of the FAX board can be reflected to the key display.

SECOND EMBODIMENT

Figure 9:
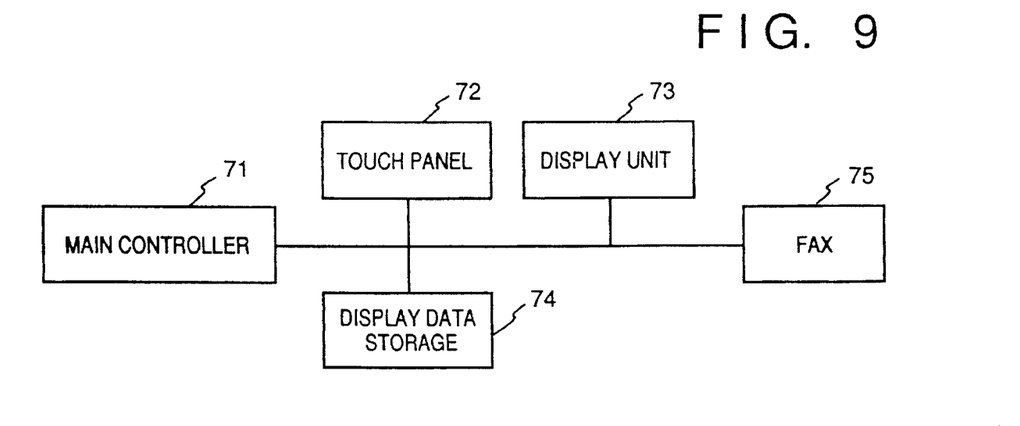
FIG. 9 is a block diagram illustrating a second embodiment of the present invention.

FIG. 9 is a block diagram illustrating the apparatus, as the second embodiment, executing the constitution without the status storage 17 shown in the first embodiment (FIG. 1).

The operation unit of the second embodiment is connected to the facsimile apparatus 75, and comprised of a main controller 71 for controlling the entire control of the operation unit, a touch panel 72 for performing a key input, a display unit 73 for performing key displays and message for touch panel, and display data storage 74 for storing the data to display on the display unit 73.

Figure 10:
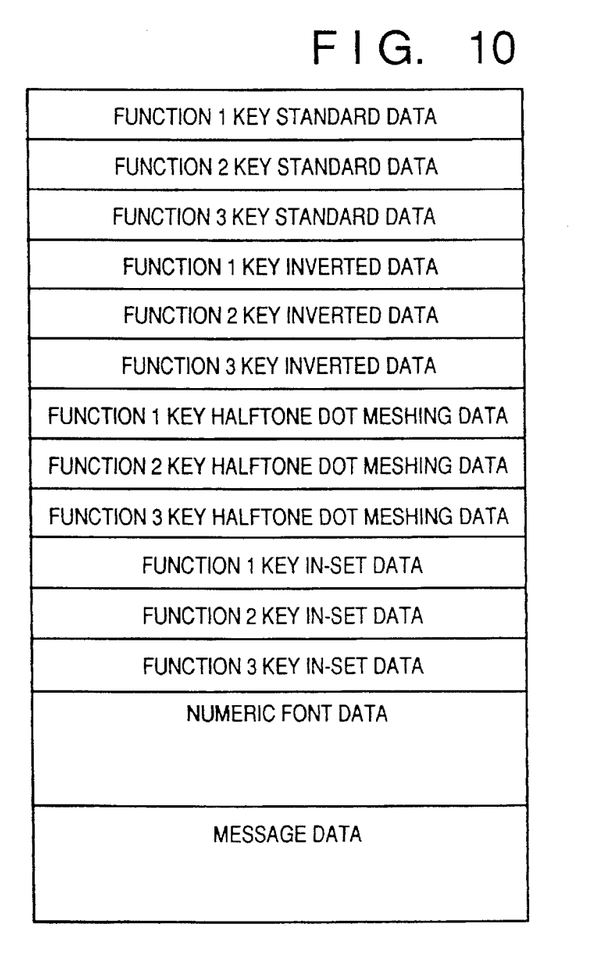
FIG. 10 is a model diagram illustrating an example of the data structure of display data storage in the second embodiment.

FIG. 10 is a model diagram illustrating an example of the data constitution of the display data storage 74.

As shown in FIG. 10, the standard data portion, inverted data portion, halftone dot meshing data portion, and in-set data portion of each key are provided on the data. Furthermore, a numeric font data portion for displaying the numbers inputted from a user and message data portion for displaying message data are provided.

Figure 11:
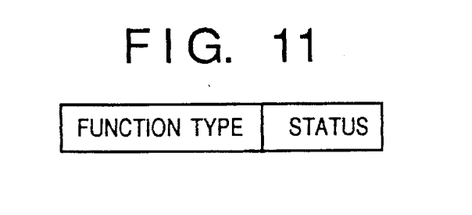
FIG. 11 is a model diagram illustrating an example of the format of data which is transmitted when a function of a FAX board is out of order in the second embodiment.

FIG. 11 is a model diagram illustrating an example of the format of data which is transmitted to the main controller 71 when a function of the FAX board became unavailable.

As shown in FIG. 11, the data format is composed of a function type portion and a status portion for indicating the status.

Figure 12A:
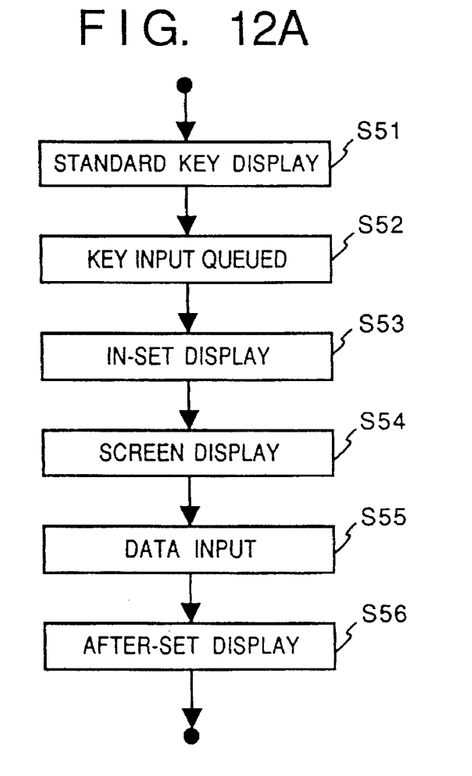
FIGS. 12A and 12B are flowcharts illustrating the operation of the second embodiment.
Figure 12B:
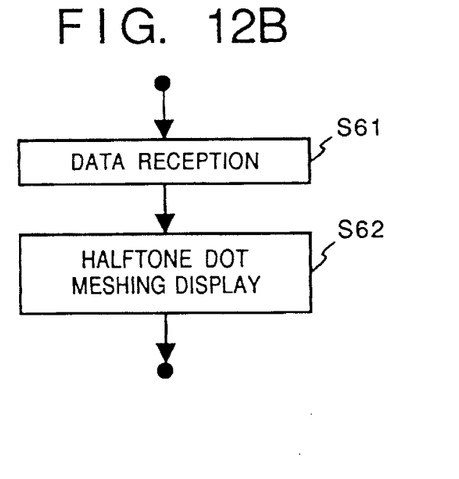
Figure 13:
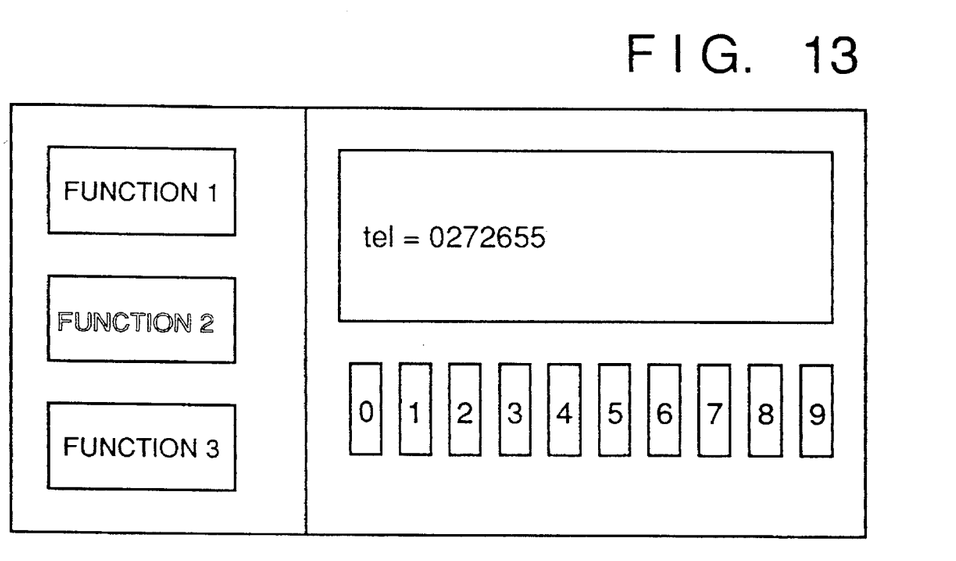
FIG. 13 is a mode diagram illustrating the display status of an actual screen in the second embodiment.

FIG. 12A and 12B are flowcharts illustrating the operation of the second embodiment, and FIG. 13 is a model diagram illustrating the display status of an actual screen.

Figure 7B:
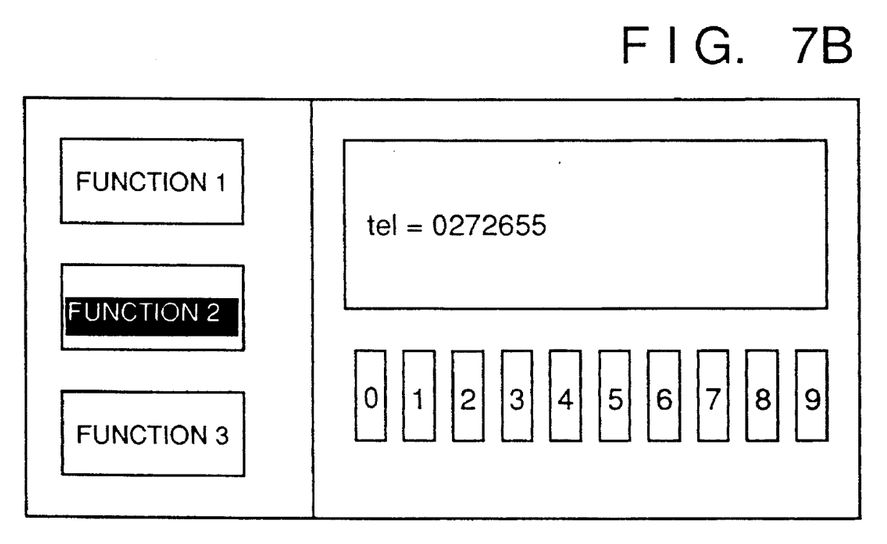

When the power is turned on, the data in the standard data portion of FIG. 10 is displayed (FIG. 7A) at step S51. At step S52, a key input is queued. When a key is inputted, the data in the in-set data portion is displayed at step S53. At step S54, the screen for setting is displayed (FIG. 13), and a data input is performed at step S55. Subsequently, at step S56, the data in the after-set data portion of FIG. 10 is displayed (FIG. 7B). Accordingly, the keys which respectively correspond to in-set and after-set are displayed.

FIG. 12B is a flowchart illustrating the processing when a function of the FAX became unavailable.

When a function became unavailable, the data of FIG. 11 is transferred to the main controller 71. When the main controller 71 receives data at step S61, the data in the half-tone dot meshing data portion of FIG. 10 corresponding to the function which became unavailable at step S62 is displayed. Accordingly, abnormality of the FAX board can be reflected to the key display.

As describe above, according to the embodiment of the invention, the status of "unavailable", "in-set" or "after-set" can be confirmed by the key displayed on a screen by including means for confirming the status of the FAX board connecting to the operation unit, means for changing the display of the key which is not functional in the above state, means for changing the display of the key function being set, means for changing the display of the function key which has been already set, and storage for storing standard display key data, display key inverted data and halftone dot meshing data, and wherein the key being set includes display means for alternatively displaying the standard key data, the after-set key includes means for displaying the key inverted data, the unavailable key includes means for displaying halftone dot meshing data. Thus, the operability is improved for an operator.

As described above, according to the first and second embodiments of this invention, "unavailable", "in-set" or "after-set" status can be confirmed by the key displayed on the screen. Thus, the operability is improved for the operator.

THIRD EMBODIMENT

Figure 14:
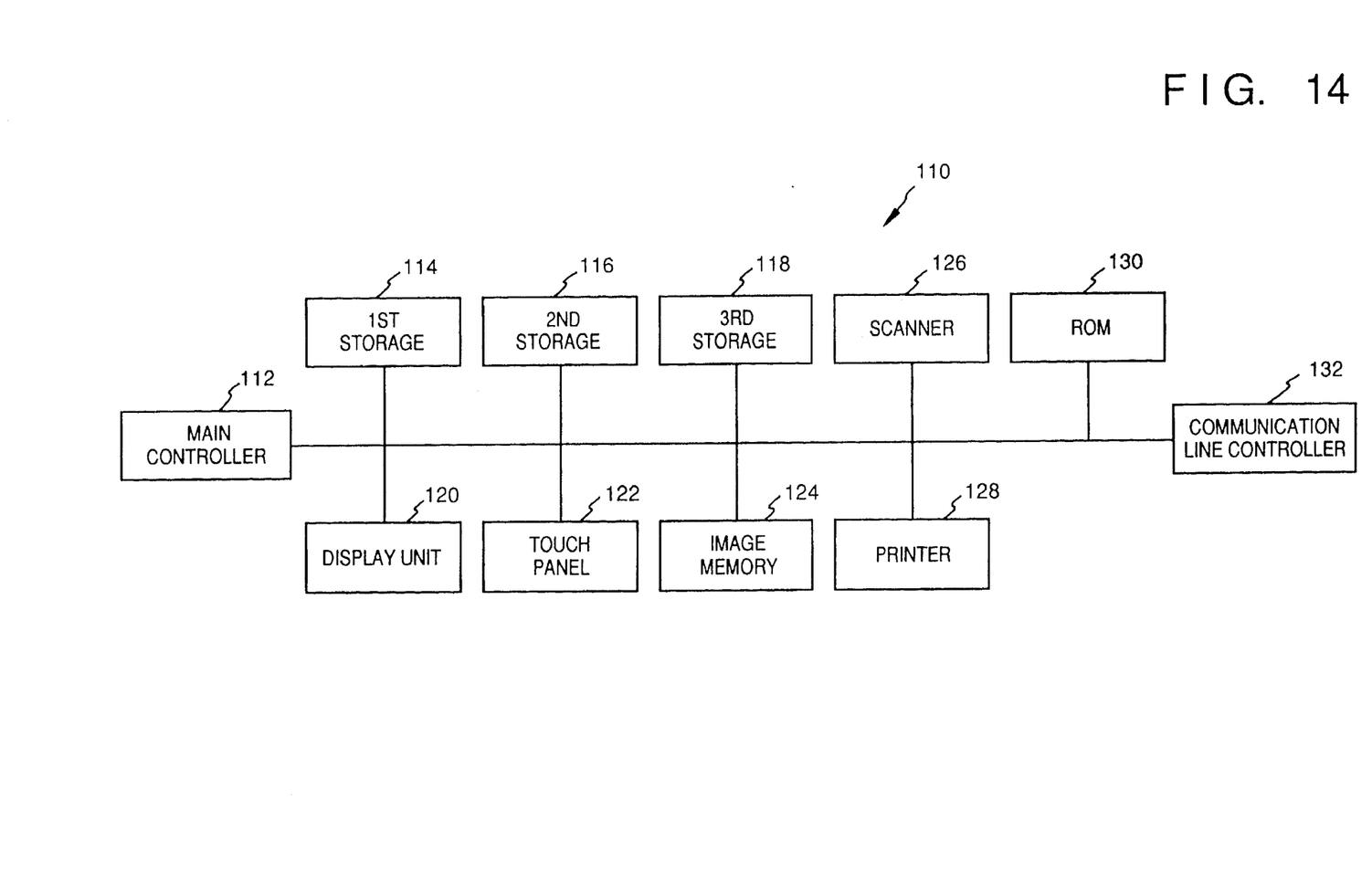
FIG. 14 is a block diagram illustrating the construction of a facsimile apparatus of a third embodiment.

FIG. 14 is a block diagram illustrating the constitution of the facsimile apparatus 110 to which the operation unit of the third embodiment is applied. In FIG. 14, numeral 112 is a main controller for controlling the operation of the entire facsimile apparatus, numeral 114 is a first storage for storing data in a button display frame displayed on the screen, numeral 116 is a second storage for storing display data displayed in a button display frame, numeral 118 is a third storage for storing arbitrary key information, that is, which function key is set in which frame on the screen. Numeral 122 is a touch panel arranged on the display unit 120, numeral 124 is an image memory for storing the image read from a scanner or the image received via a telephone communication line, numeral 126 is a scanner, numeral 128 is a printer for printing the image in the image memory, numeral 130 is a ROM for storing the operation program and image data of the facsimile apparatus 110, and numeral 132 is a controller of the telephone communication line.

Figure 15:
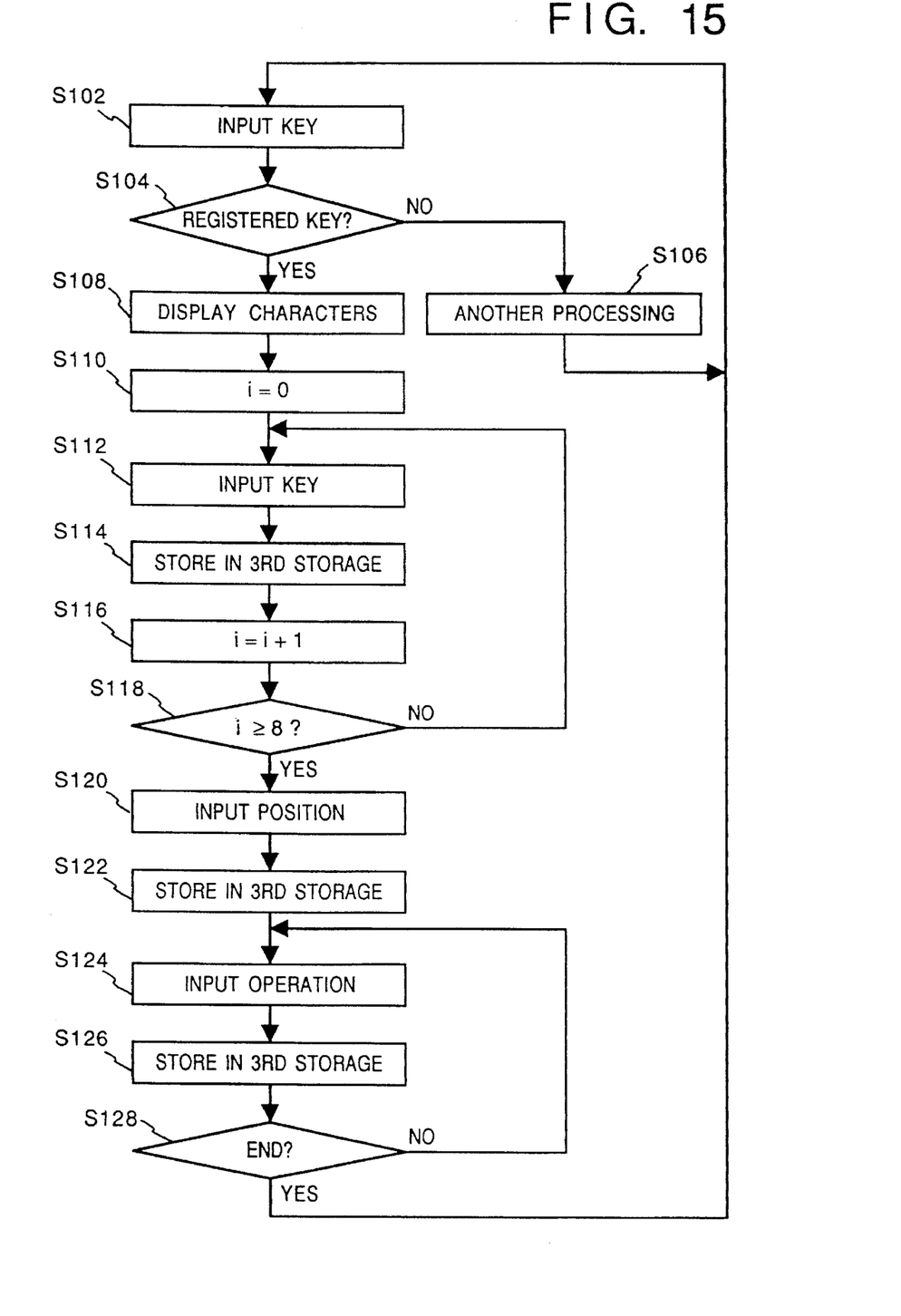
FIG. 15 is a flowchart illustrating the flow of the operation for button registration in the facsimile apparatus.
Figure 16:
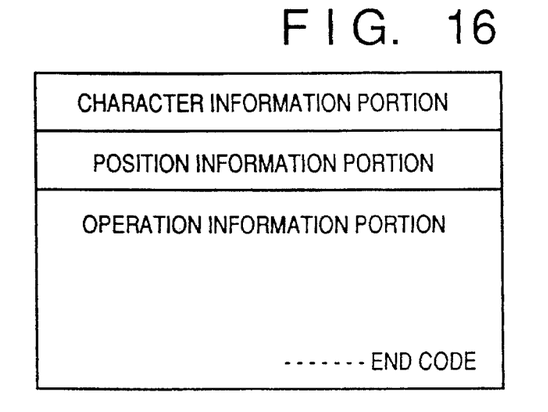
FIG. 16 is a diagram illustrating an example of the storage format of a third storage which stores key information to be registered.

FIG. 15 is a flowchart illustrating the flow of the bottom registration operation in the facsimile apparatus 110. FIG. 16 is a diagram illustrating an example of the storage format of the third storage 118 which stores key information to be registered.

At step S102, a key input from the touch panel is queued. When the key is inputted at step S102, whether or not the key indicates key registration is determined at step S104.

If it is not, the processing corresponding to the function of the key is performed by step S106.

Figure 18:
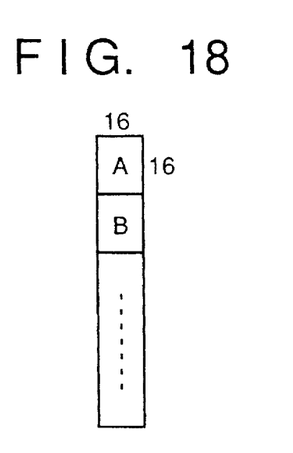
FIG. 18 is a diagram illustrating the state where characters stored in the second storage are displayed on the screen.

At step S104, when it is determined that the pressed button indicates the key registration, the process proceeds to step S108 where characters stored in the second storage 116 are displayed on the screen. The second storage 2 stores alphabetical characters in the full-size character as shown in FIG. 18 such as 16×16 bits. The user selects eight characters from the alphabetical characters, and the eight characters can be displayed as a term indicating the function of the button in the button frame. For example, if it is the button for transmission, the user can display the eight characters such as "TRANSMIT" in the button frame. Accordingly, the processing from step S10 to S118 is the operation to sequentially select characters to be displayed in the button frame.

At step S110, the character counter i=0 is set, and a key input is queued at step S112. The user selects a first character to be displayed in the button frame from the characters displayed on the screen, and presses the touch panel key on the selected character. It is assumed that each key on the touch panel corresponds to a unique character. When the key input is performed, at step S114, the character data corresponding to the input key is stored in the i-th character in the character information portion of the third storage 118. At step S116, the character counter is incremented by one. At step S118, whether or not the character counter i is over 8 is determined. If the character counter i is 7 or less than 7, the process returns to step S112. When the processing from step S112 to S116 is repeated 8 times, 8 characters to be displayed in the button frame are selected.

Figure 17:
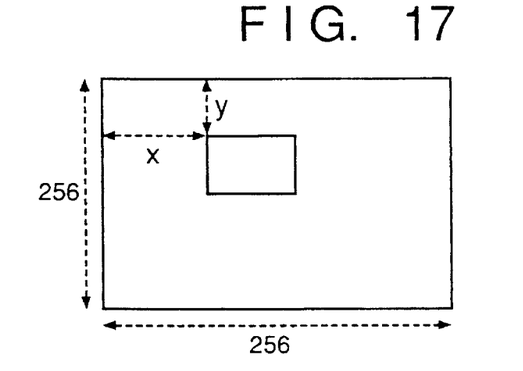
FIG. 17 is a diagram illustrating an example of the coordinates of a button position on the screen.

At step S118, when the character counter i is 8 or more than 8, the process progresses to step S120, and the button position to determine the position of the button on the screen is inputted. The button position is set by inputting the coordinate (x, y) on the screen. An example of the coordinate of the button position is shown in FIG. 17.

At step S120, the coordinate of the button position is stored in the button position information portion in the third storage 118 at step S112. Subsequently, at step S124, the operation (function) input which determines what is operated by the instruction corresponding to the set button is queued. The input operation is stored in the operation information portion of the third storage 118 at step S126. At step S128, whether or not it is the end code is checked. If not, the process returns to step S124, while if so, the processing of the button registration ends. If this processing is repeated several times, buttons of arbitrary operations can be set on a single screen in an arbitrary arrangement.

The display of the registered keys and the processing when the registered key is pressed are described with reference to the flowchart shown in FIG. 19.

At step S130, the button frame stored in the first storage 114 is displayed at the position on the screen stored in the third storage 118. The button frame is displayed at the arrangement as registered in the operation of the button registration.

Subsequently, at step S132, the characters stored in the character information portion of the third storage 118 is displayed in the position shown in the position portion, that is, the button frame. Accordingly, the user can visually judge which button performs what operation.

When the button frame and characters are displayed, a key input is queued at step S134.

When a key input is performed at step S134, whether or not the input key is a registered key is determined at step S136.

If not, the processing corresponding to the key is performed at step S140. If it is a registered key, the operation stored in the operation information portion of the third storage is executed at step S138.

In the embodiment, as described above, the user can set arbitrary operational buttons in an arbitrary arrangement on a single screen. Accordingly, the user can arrange the frequently-used-buttons on the single screen, and the operability of the operation unit of the facsimile apparatus is improved.

Since an arbitrary character can be displayed on the key, the operation of the button can be identified at a glance.

In the embodiments, the invention is applied to the facsimile apparatus, however, this does not impose a limitation upon the invention. For example, the invention can be also applied to a copying apparatus.

The present invention is not limited to the above embodiments and various changes and modifications can be made within the spirit and scope of the present invention. Therefore, to apprise the public of the scope of the present invention the following claims are made.

What is claimed is:

1. Electronic equipment having an operation unit, comprising:

a touch panel for inputting information to the electronic equipment;

a display for displaying key images input on said touch panel;

display data storage means for storing data which is displayed on said display, said display data storage means having a first storage for storing key frame data as the display data and a second storage for storing character data as the display data;

setting means for setting a displaying position of the key frame data stored in said first storage and for selecting displaying characters from the character data stored in said second storage, said setting means positioning the key frame data at an arbitrary position on said display and selecting arbitrary characters as the displaying characteristics; and setting data storage means for storing the displaying position of the key frame data set by said setting means and the displaying characters selected by said setting means, said setting data storage means being able to repeatedly display the key frame data and the displaying characteristics at the displaying position.

2. Electronic equipment having an operation unit, comprising:

a touch panel for inputting information to the electronic equipment;

a display for displaying key images input on said touch panel;

a first storage for storing key frame data of the key images displayed on said display;

a second storage for storing character data of the key images displayed on said display;

setting means for setting a displaying position of the key frame data stored in said first storage and for selecting displaying characters from the character data stored in said second storage, said setting means positioning the key frame data at an arbitrary position on said display and selecting arbitrary characters as the displaying characters and setting a function at a key frame; and a third storage for storing the displaying position of the key frame data set by said setting means and the displaying characters selected by said setting means and the function of the key frame set by said setting means, said third storage being able to repeatedly display the key frame data and the displaying characters at the displaying position on said display, and the function being achieved when the key frame and the displaying characters are combined and handled as a new key.

3. The electronic equipment according to claim 2, wherein said setting means can set a plurality of combinations of the key frame position, the displaying characters and the key function and store them in said third storage, and the plurality of combinations are displayed on said display as a plurality of keys.

4. The electronic equipment according to claim 3, wherein said third storage can sequentially display keys which are used frequently and are stored in said third storage, and can set all keys which are used frequently in one frame of said display.

* * * * *

UNITED STATES PATENT AND TRADEMARK OFFICE
CERTIFICATE OF CORRECTION

PATENT NO. : 5,555,104
DATED : September 10, 1996
INVENTOR(S) : Todaka

It is certified that error appears in the above-indentified patent and that said Letters Patent is hereby corrected as shown below:

On drawing

Figure 19:
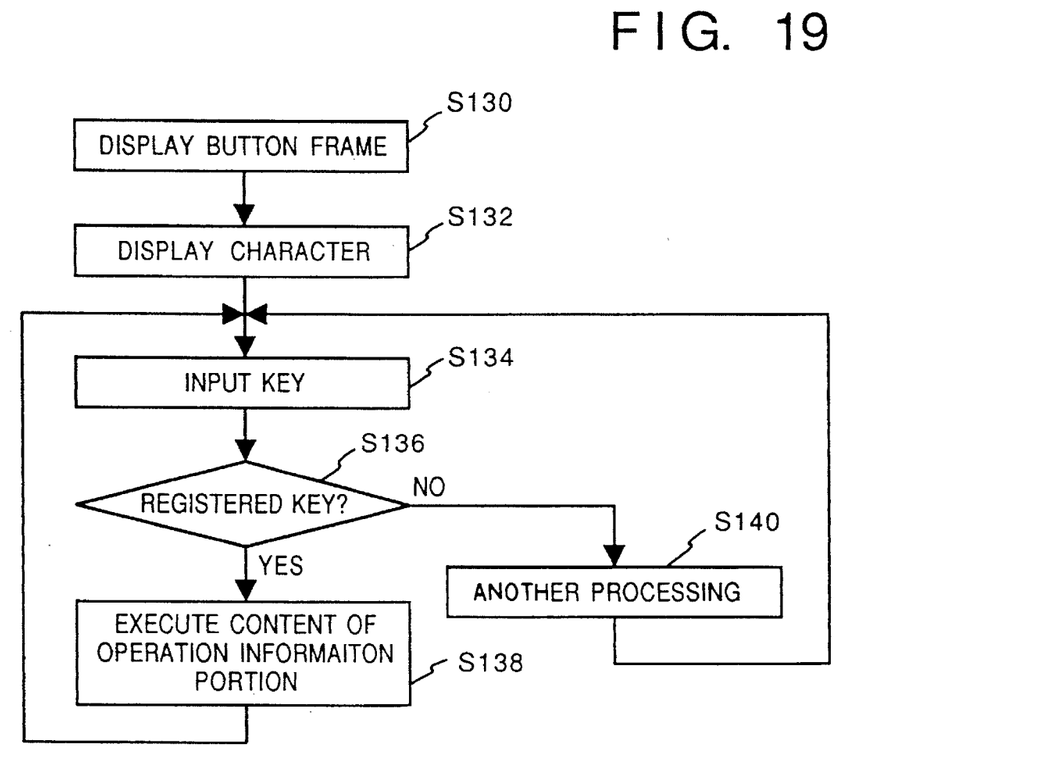
FIG. 19 is a flowchart illustrating the flow of the processing where a registered key is displayed and pressed.

SHEET 13:

FIG. 19, "INFORMAITON" should read --INFORMATION--.

Signed and Sealed this

Twenty-fourth Day of June, 1997

Attest:

BRUCE LEHMAN

Attesting Officer          Commissioner of Patents and Trademarks